C. C. WALLACE.
PREPARATION OF ANHYDROUS MAGNESIUM CHLORID.
APPLICATION FILED APR. 22, 1916.

1,301,766.

Patented Apr. 22, 1919.

Inventor:
Curtis C. Wallace,
by
His Attorney.

UNITED STATES PATENT OFFICE.

CURTIS C. WALLACE, OF SCHENECTADY, NEW YORK, ASSIGNOR TO GENERAL ELECTRIC COMPANY, A CORPORATION OF NEW YORK.

PREPARATION OF ANHYDROUS MAGNESIUM CHLORID.

1,301,766.  Specification of Letters Patent.  Patented Apr. 22, 1919.

Application filed April 22, 1916. Serial No. 92,821.

*To all whom it may concern:*

Be it known that I, CURTIS C. WALLACE, a citizen of the United States, residing at Schenectady, in the county of Schenectady, State of New York, have invented certain new and useful Improvements in the Preparation of Anhydrous Magnesium Chlorid, of which the following is a specification.

Magnesium chlorid as it is commonly known to chemists contains combined water, and this combined water cannot be removed by any simple process otherwise than heating in an atmosphere of hydrochloric acid, without causing secondary chemical reaction with the formation of magnesium oxid and hydrochloric acid. As pure anhydrous magnesium chlorid is desired in the chemical industry, particularly for the production of electrolytic magnesium, it is the object of my present invention to provide a new process which may be made continuous, resulting in anhydrous magnesium chlorid.

In accordance with my invention anhydrous magnesium chlorid is prepared by first producing a substantially anhydrous double chlorid of ammonium and magnesium and then dissociating this double chlorid with the formation of anhydrous magnesium chlorid and the evolution of ammonium chlorid.

In carrying out my process, the temperature of all parts of the charge of hydrous ammonium-magnesium chlorid is maintained materially below the temperature at which appreciable dissociation of the double chlorid occurs, say, not materially higher than about 215 to 230° C., until the dehydration is complete, the anhydrous ammonium magnesium chlorid is then heated to a higher temperature, say, 300° C. or higher, thereby dissociating the double salt with the production of substantially pure anhydrous magnesium chlorid. Other features of my invention will be explained in the following specification and pointed out with particularity in the appended claims.

Figure 1:
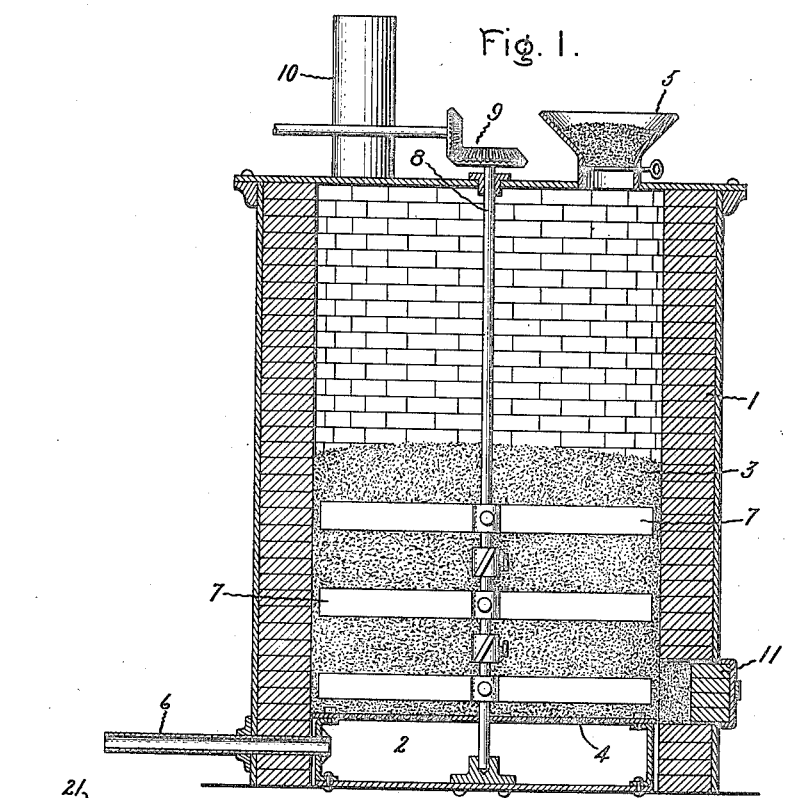
Figure 2:
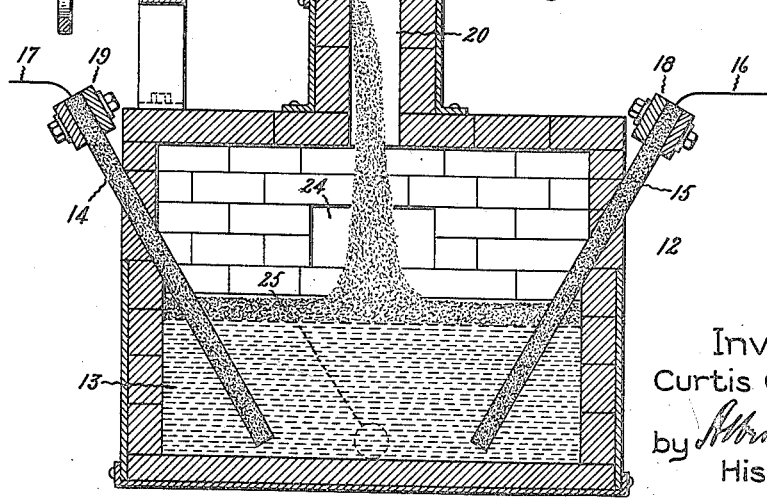

In the accompanying drawing, Figure 1 is a vertical section of one form of apparatus for dehydrating a double chlorid of ammonium and magnesium, and Fig. 2 is a vertical section of one form of heating device for dissociating the dehydrated double chlorid with the production of anhydrous magnesium chlorid.

The hydrated ammonium magnesium chlorid may be prepared by dissolving in water molecular proportions of hydrated magnesium chlorid ($MgCl_2.6H_2O$) and ammonium chlorid ($NH_4Cl$) and evaporating the solution at a temperature of about 125 to 130° C. until crystals of the double salt are produced.

By a modified process ammonium-magnesium chlorid containing less combined water than the above product, may be prepared. The hydrated magnesium chlorid ($MgCl_2.6H_2O$) is melted at about 110° C., and a molecular quantity of dried ammonium chlorid is added to the fusion. The temperature is raised from 180 to 183° until the ammonium chlorid is completely dissolved producing a viscous fusion which may be poured at about 178° C. and which solidifies slightly below this temperature to a glassy mass but never passes through a crystalline state. This product is new as far as I am aware. It may be reduced to a powder by crushing or grinding, or by atomizing it while liquid with a blast of air or other suitable gas in a suitable condensing chamber.

The hydrated ammonium magnesium chlorid produced by either one of the above processes is heated in a suitable furnace to a temperature high enough to drive off water that is above 100° C. but materially below the temperature at which appreciable dissociation of the double chlorid occurs. For this purpose double chlorid in a comminuted state, for example, as small crystals, may be heated in an ordinary reverberatory furnace heated either with coal or gas fuel, particular care being taken to keep the salt well stirred so as to avoid caking and local overheating of any part of the mass before all of the salt has been thoroughly dehydrated. As the evolution of the combined water will absorb heat the temperature of the heated gaseous products of combustion coming into contact with the charge of salt which is to be dried may be above the dissociation temperature without causing the salt itself to even approximate the dissociation temperature. The heat capacity of air, or of furnace gas, is so small as compared with the absorption of heat by evaporation of combined water from the salt that heated gases alone will not cause the dissociation of the double salt if the mass is continuously agitated. The hydrated ammonium magnesium chlorid may also be heated in an electric resistance furnace without agitation, particular care being exercised not to permit the temperature of the furnace to substantially exceed 150 to 160° C.

A convenient apparatus for drying the double chlorid is shown in section in Fig. 1 of the drawing. This apparatus consists of a metal-clad brick container 1 provided with a hollow base providing a chamber 2. The charge 3 of salt to be dehydrated rests upon an iron plate 4 which contains numerous perforations, as indicated in the drawing. When a charge of hydrous ammonium chlorid has been introduced into this apparatus through a hopper 5 a blast of heated gas is introduced through the pipe 6 and escapes through the holes in the plate 4 into contact with the charge of salt. The charge is maintained in constant agitation by the iron stirring blades 7 mounted upon a shaft 8 which is driven through a gear 9 by any suitable source of power, not shown. The heated gas may be obtained in any suitable way, for example, by passing air through a coke fire or by the combustion of fuel oil or gas. The heated gas need not necessarily be free from moisture as long as it is not saturated; in other words, is still at the given temperature able to take up an additional amount of moisture. After passing through the charge the heated gas escapes through the flue 10.

As the double chlorid loses combined water its temperature progressively rises and when the temperature of the dehydrated residue is about 215 to 230° C. the heating is discontinued and the dehydrated salt removed through a door 11.

It is possible by making the furnace longer and placing it upon its longitudinal axis to make the process continuous, charging the double chlorid to be dehydrated in one end of the furnace and working it by gravity or otherwise with continued agitation to the opposite end of the furnace where the heated air or other gas is introduced. As the salt to be dehydrated and the gas travel in opposite directions the moisture may be completely removed by the time it has reached the end of the furnace at which the heated gas current is introduced so that the dehydrated salt may be continuously discharged.

The dehydrated ammonium magnesium chlorid is heated in any convenient way to a temperature above about 300° C. in order to dissociate the same, driving off ammonium chlorid and leaving anhydrous magnesium chlorid.

As described and claimed in a co-pending application by Christian Dantsizen, Serial No. 92,841 filed concurrently herewith, the dissociation process may be conveniently carried out by charging the dehydrated double salt into apparatus containing fused magnesium chlorid, as shown in Fig. 2.

This apparatus comprises a fire-brick container 12 reinforced with metal in which is maintained a fusion 13 of a suitable salt having a fusing temperature well above 300° C. Dehydrated magnesium chlorid may be used and maintained at a temperature of about 600 to 650° C., but if this salt is not available at the beginning of the operation and the magnesium chlorid is desired for the electrolysis of magnesium, the fusion may consist of sodium, or potassium chlorid as the mixture of these salts with magnesium chlorid is readily electrolyzable. The salt is maintained heated by the passage of an alternating current therethrough, the current being introduced by carbon electrodes 14 and 15. The current supply wires 16 and 17 are merely indicated at the electrode clamps 18 and 19. The salt to be dissociated is introduced through the stack 20 communicating with a hopper 21 in which is located a screw feed 22 operable through a hand-wheel 23. As the ammonium magnesium chlorid comes in contact with the fusion which should be maintained at a temperature well above 300° ammonium chlorid is volatilized and escapes through an opening 24. The ammonium chlorid may be condensed and used over again but as this apparatus constitutes no part of my invention the condensing chamber has not been shown in the drawing. The accumulations of magnesium chlorid are withdrawn from time to time through a tap hole 25. The solidified magnesium chlorid does not readily take up moisture and may be stored for use.

What I claim as new and desire to secure by Letters Patent of the United States, is:—

1. The process of preparing anhydrous magnesium chlorid which consists in passing heated gas through a charge of hydrated double chlorid of ammonium and magnesium while actively agitating said chlorid, the temperature of said gas being materially in excess of about 215 to 230° C., thereby heating said chlorid and eliminating water therefrom, discontinuing the passage of gas through said charge when the temperature of the residue of anhydrous chlorid is about 215 to 230° C. and finally heating the anhydrous double chlorid to the dissociating temperature.

2. The process of dehydrating hydrous ammonium magnesium chlorid which consists in heating a charge of said chlorid to a temperature high enough to cause dehydration but materially below the temperature at which appreciable dissociation of said double chlorid occurs, and passing a gas unsaturated with moisture through said charge during the continuance of said heating.

3. The process of dehydrating hydrous ammonium magnesium chlorid which consists in passing in contact with said chlorid a gas heated to a temperature materially above 100° C. and below the temperature at which dissociation of said chlorid occurs, thereby dehydrating said chlorid.

4. The process of preparing anhydrous magnesium chlorid substantially free from magnesium oxid which consists in heating a charge of anhydrous ammonium-magnesium chlorid to a temperature not substantially in excess of about 215 to 230° C., continuing the heating at or below this temperature until said chlorid is substantially completely dehydrated, and then charging the anhydrous ammonium-magnesium chlorid into a bath of fused magnesium chlorid, thereby dissociating said double chlorid with the production of ammonium chlorid and magnesium chlorid.

In witness whereof, I have hereunto set my hand this 21st day of April 1916.

CURTIS C. WALLACE.